(12) United States Patent
Shen

(10) Patent No.: US 11,302,128 B2
(45) Date of Patent: Apr. 12, 2022

(54) EASY UNLOCKING METHOD WITH SAFETY USING AN ELECTRONIC KEY AND A BIOLOGICAL FEATURE

(71) Applicant: I-Ting Shen, Tainan (TW)

(72) Inventor: I-Ting Shen, Tainan (TW)

( * ) Notice: Subject to any disclaimer, the term of this patent is extended or adjusted under 35 U.S.C. 154(b) by 221 days.

(21) Appl. No.: 16/568,417

(22) Filed: Sep. 12, 2019

(65) Prior Publication Data

US 2021/0056791 A1  Feb. 25, 2021

(30) Foreign Application Priority Data

Aug. 20, 2019 (TW) .................................. 108129596

(51) Int. Cl.
*G07C 9/00* (2020.01)
*E05B 47/00* (2006.01)
*H04W 4/80* (2018.01)

(52) U.S. Cl.
CPC .......... *G07C 9/00944* (2013.01); *E05B 47/00* (2013.01); *H04W 4/80* (2018.02); *E05B 2047/0095* (2013.01)

(58) Field of Classification Search
CPC ............ G07C 9/00944; G07C 2209/14; G07C 9/00174; G07C 9/26; E05B 47/00; E05B 2047/0095; H04W 4/80
See application file for complete search history.

(56) References Cited

U.S. PATENT DOCUMENTS

| | | | |
|---|---|---|---|
| 9,984,523 B1* | 5/2018 | Shen | G07C 9/00174 |
| 10,559,143 B1* | 2/2020 | Shen | G07C 9/37 |
| 2010/0089109 A1* | 4/2010 | Bliding | G07C 9/00944 70/280 |
| 2014/0150502 A1* | 6/2014 | Duncan | E05B 67/14 70/20 |
| 2015/0222517 A1* | 8/2015 | McLaughlin | H04L 67/04 713/156 |
| 2016/0307380 A1* | 10/2016 | Ho | H04L 65/1069 |
| 2017/0053467 A1* | 2/2017 | Meganck | G07C 9/00563 |
| 2017/0078260 A1* | 3/2017 | Shen | G07C 9/00309 |
| 2017/0171204 A1* | 6/2017 | Forood | H04W 4/00 |
| 2017/0332055 A1* | 11/2017 | Henderson | H04N 7/186 |
| 2018/0061155 A1* | 3/2018 | Ghorpade | G07C 9/00309 |
| 2018/0151011 A1* | 5/2018 | Ichida | G07C 9/00309 |
| 2019/0066415 A1* | 2/2019 | Pang | H04W 12/06 |

(Continued)

*Primary Examiner* — Brian E Miller
(74) *Attorney, Agent, or Firm* — Alan D. Kamrath; Karin L. Williams; Mayer & Williams PC

(57) ABSTRACT

An unlocking method includes using an electronic key to execute a lock control app. An account number and a password are set and stored under guidance of the lock control app. A predetermined biological feature is inputted after login of the lock control app and is used to create an authenticated biological feature. The electronic key is used to match with a lock under guidance of the lock control app which is executed as a background program after matching is successful. An unlocking information is outputted to the lock when the authenticated biological feature matches with a biological feature inputted while the electronic key is connected to the lock. The lock switches to an unlocking state when the unlocking information is identified as being correct. When no biological feature is inputted while the electronic key is connected to the lock, the electronic key is disconnected from the lock.

8 Claims, 2 Drawing Sheets

(56) References Cited

U.S. PATENT DOCUMENTS

| | | | |
|---|---|---|---|
| 2019/0147157 A1* | 5/2019 | Moorman | H04W 4/80 |
| | | | 713/171 |
| 2019/0260590 A1* | 8/2019 | Kuenzi | H04L 9/3234 |
| 2019/0304227 A1* | 10/2019 | Chen | H04L 63/0492 |
| 2020/0043271 A1* | 2/2020 | Anderson | F21V 33/006 |
| 2020/0082656 A1* | 3/2020 | Pan | G07C 9/26 |
| 2020/0098207 A1* | 3/2020 | Liao | G07C 9/00309 |
| 2021/0056791 A1* | 2/2021 | Shen | G07C 9/00944 |
| 2021/0158067 A1* | 5/2021 | Hsu | G06F 21/35 |

* cited by examiner

EASY UNLOCKING METHOD WITH SAFETY USING AN ELECTRONIC KEY AND A BIOLOGICAL FEATURE

BACKGROUND OF THE INVENTION

The present invention relates to an easy unlocking method with safety and, more particularly, to an unlocking method using an electronic approach and a biological feature to control unlocking of a lock.

With the progress of technology, locks have been improved from conventional mechanical unlocking into combined mechanical and electrical unlocking generally used in electronic locks that can be operated through an electronic key and a smart mobile device for unlocking operation. The electronic key and the smart mobile device generally uses a remote unlocking technology for convenience purposes. Namely, the electronic key and the smart mobile device can be connected to the lock for unlocking operation when the electronic key and the smart mobile device are spaced from the lock. However, in this technology, the signal could be intercepted and decoded by a person using electronic equipment. Furthermore, when the electronic key or the smart mobile device is lost, a person picking up the electronic key or the smart mobile device can use it to unlock the lock.

BRIEF SUMMARY OF THE INVENTION

In a first aspect, an unlocking method according to the present invention includes:

using an electronic key to execute a lock control app for a first time, wherein the lock control app is configured to control a lock, and wherein an account number and a password are set and stored under guidance of the lock control app;

entering an account and a password to log in under guidance of the lock control app, wherein login of the lock control app is forbidden when the entered account is not identical to the stored account number or the entered password is not identical to the stored password, and wherein login of the lock control app is permitted when the entered account is identical to the stored account number and the entered password is identical to the stored password;

inputting a predetermined biological feature after login of the lock control app;

creating an authenticated biological feature based on the predetermined biological feature;

matching the electronic key with a lock under guidance of the lock control app, wherein the matching is repeated when the matching with the lock fails;

executing the lock control app as a background program after matching with the lock is successful:

checking whether the electronic key is connected to the lock, wherein when a biological feature is inputted while the electronic key is connected to the lock, identifying whether the inputted biological feature matches with the authenticated biological feature, wherein an unlocking information is outputted to the lock connected to the electronic key when the inputted biological feature matches with the authenticated biological feature, wherein the unlocking information is not outputted when the inputted biological feature does not match with the authenticated biological feature, and wherein when no biological feature is inputted while the electronic key is connected to the lock, the electronic key is disconnected from the lock; and identifying whether the unlocking information is correct, wherein the lock switches to an unlocking state when the unlocking information is identified as being correct, and wherein the lock remains in a locking state when the unlocking information is identified as being incorrect.

In an example, the electronic key is in a form of a smart mobile device. The lock control app is installed in the smart mobile device. The unlocking method further comprises identifying whether a biological feature is inputted when the electronic key is not connected to the lock. The smart mobile device takes no action when no biological feature is inputted. When the biological feature is inputted while the electronic key is not connected to the lock, whether a biological feature identification is successful is carried out. The smart mobile device is awakened when the biological feature identification is successful. The smart mobile device is not awakened when the biological feature identification fails.

In a second aspect, an unlocking method according to the present invention includes:

executing a lock control app by using a smart mobile device, and storing a selected account number and a selected password in the lock control app, wherein the lock control app is configured to control a lock and is installed in the smart mobile device;

entering an account and a password to log in the lock control app under guidance of the lock control app, wherein login of the lock control app is forbidden when the entered account is not identical to the stored selected account number or the entered password is not identical to the stored selected password, and wherein login of the lock control app is permitted when the entered account is identical to the stored selected account number and the entered password is identical to the stored selected password;

inputting a selected biological feature after login of the lock control app;

creating an authenticated biological feature based on the selected biological feature:

matching the smart mobile device with a lock under guidance of the lock control app, wherein the matching is repeated when the matching with the lock fails, and wherein the smart mobile device becomes an electronic key when the matching with the lock is successful;

executing the lock control app as a background program after matching with the lock is successful;

checking whether the electronic key is connected to the lock, wherein when a biological feature is inputted while the electronic key is connected to the lock, identifying whether the inputted biological feature matches with the authenticated biological feature, wherein an unlocking information is outputted to the lock connected to the electronic key when the inputted biological feature matches with the authenticated biological feature, wherein the unlocking information is not outputted when the inputted biological feature does not match with the authenticated biological feature, and wherein when no biological feature is inputted while the electronic key is connected to the lock, the electronic key is disconnected from the lock; and identifying whether the unlocking information is correct, wherein the lock switches to an unlocking state when the unlocking information is identified as being correct, and wherein the lock remains in a locking state when the unlocking information is identified as being incorrect.

In an example, matching with the lock includes storing an identification information related to the lock in the electronic key. The identification of the unlocking information includes comparing a lock identification information contained in the unlocking information with the identification information stored in the lock.

In an example, the electronic key is connected to the lock by near-field communication, and wherein checking whether the electronic key is connected to the lock includes placing the electronic key near the lock. By using near-field communication, the unlocking information is less likely to be intercepted by any person at a remote location.

Through the background program execution of the lock control app, the method according to the present invention can rapidly connect the electronic key (the smart mobile device) with the lock. Furthermore, by inputting the real-time biological feature through the biological feature pick-up device, the lock can be unlocked without additional manual operation of the lock control app. Thus, convenient use is provided, and the unlocking speed is fast.

The present invention will become clearer in light of the following detailed description of illustrative embodiments of this invention described in connection with the drawings.

All figures are drawn for ease of explanation of the basic teachings of the present invention only; the extensions of the figures with respect to number, position, relationship, and dimensions of the parts to form the embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 1:
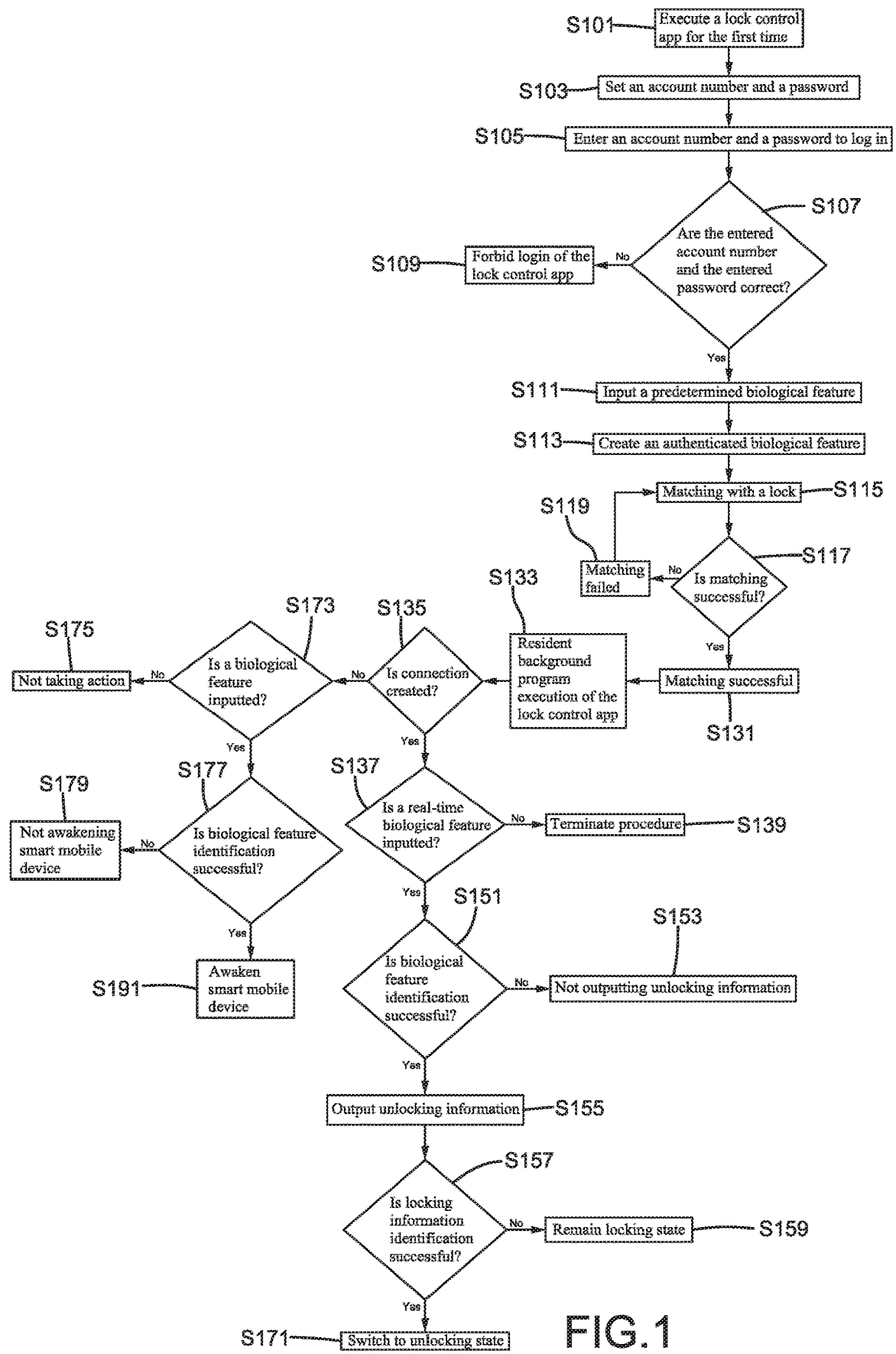
FIG. 1 shows a flowchart illustrating an example of an unlocking method according to the present invention.
Figure 2:
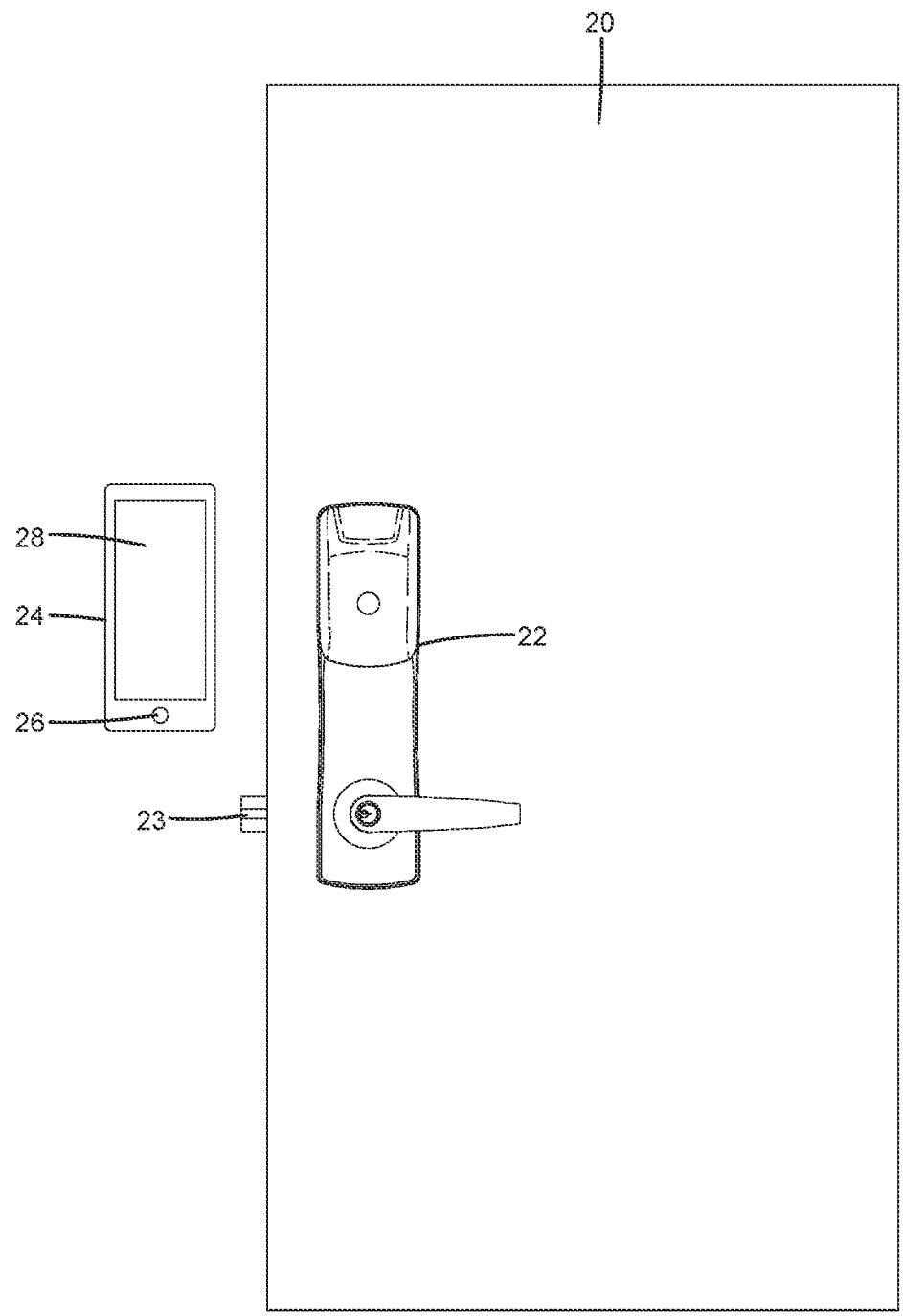
FIG. 2 is a schematic diagram illustrating an example of application of the unlocking method according to the present invention.

With reference to FIGS. 1 and 2, an easy unlocking method with safety according to the present invention is used to easily and rapidly unlock a lock with reliable safety. For the sake of explanation, it will be assumed that the easy unlocking method with safety according to the present invention is used to unlock a lock 22 mounted on a door 20. The lock 22 includes a latch 23 movable to an extended, latching position in which the latch 23 engages with a latch hole in a door frame to prevent opening of the door 20. After the door 20 is unlocked, the latch 23 can be moved to a retracted, unlatching position permitting opening of the door 20. The lock 22 can be matched with at least one electronic key 24. In this embodiment, the electronic key 24 is formed by a smart mobile device including a biological feature pick-up device 26 and a touch screen 28 for displaying and for inputting information. The biological feature pick-up device 26 can be a fingerprint pick-up device.

In an example of the easy unlocking method (hereinafter referred to as "the method") with safety according to the present invention involves use of the lock 22 and the electronic key 24. The method includes using the electronic key 24 to execute a lock control app for the first time (step S101) for controlling the lock 22. Specifically, a smart mobile device is used to download and install the lock control app. The lock control app is executed after installation. In step S103, an account number and a password are set. Specifically, during first execution of the lock control app, an account number and a password are set under guidance of the lock control app. More specifically, the touch screen 28 of the smart mobile device is used to input an account number and a password (which are selected by a user) on an interface of the lock control app, and the selected account number and the selected password are stored in the lock control app.

Then, a biological feature can be inputted. Specifically, in step S105, an account number and a password are entered under guidance of the lock control app. The account number and the password entered are identified in step S107. When at least one of the account number and the password entered is identified as being incorrect (the entered account number is not the same as the stored account number and/or the entered password is not the same as the stored password), the lock control app deny the user to log in (S109).

When the entered account number and the entered password are identified as being correct (the same as the stored account number and the stored password), a predetermined biological feature of the user can be entered (step S111). Specifically, the biological feature can be inputted through the biological feature pick-up device 26 and can be used to create an authenticated biological feature (step S113) which is stored in a memory of the smart mobile device. It is noted that a plurality of biological features of different users can be inputted into the smart mobile device to create a plurality of authenticated biological features.

Next, the lock control app guides the smart mobile device to match with a lock 22 (step S115). In step S117, the matching is identified. When the matching is identified as being failed (step S119), the step S115 can be repeated. The matching of the lock 22 includes sending a unique lock identification information related to the lock 22 to the smart mobile device and storing the unique lock identification information in the smart mobile device. The lock identification information can be a hardware identification number or an encoded packet.

When the matching is identified as being successful (step S131), the lock control app is executed as a background program (step S133). Furthermore, after successful matching of the smart mobile device and the lock 22, the smart mobile device becomes an electronic key 24 that can be used to control unlocking of at least one lock 22 that has been matched. Background program execution of the lock control app means that after the lock control app is executed, the lock control app is not shut down even if the interface of the lock control app is not displayed on the touch screen 28 of the smart mobile phone. The background program execution of the lock control app simplifies the unlocking process of the lock 22, particularly in the speed of creating a mutual connection between the electronic key 24 and the lock 22 from a disconnected status.

In step S135, connection between the electronic key 24 and the lock 22 is checked. Specifically, the resident background program execution of the lock control app automatically detects whether the electronic key 24 is connected to the lock 22. In this example, the electronic key 24 and the lock 22 are connected via near-field communication (NFC). Thus, the electronic key 24 is placed in a sensing location near the lock 22 to create the connection.

Note that even though the electronic key 24 is not connected to the lock 22, the electronic key 24 (the smart mobile device) still detects whether a biological feature is inputted (step S173). When no biological feature is inputted, no action is taken by the smart mobile device (step S175). Namely, the smart mobile device stays in a status in which the touch screen 28 does not show any picture.

In step S177, the biological feature is identified while the smart mobile device (the electronic key 24) is not connected to the lock 22. When the biological feature identification fails, the smart mobile device is not awakened (step S179). On the other hand, when the biological feature identification is successful, the smart mobile device is awakened (step S191). This provides the electronic key 24 formed by the smart mobile device with a function of controlling the lock 22 without adversely affecting original operation of the smart mobile device. Some of smart mobile devices include a fingerprint pick-up device permitting picking up of fingerprints of a holder and a touch screen 28. Thus, when the electronic key 24 (the smart mobile device) is not connected to the lock 22, the holder can input his or her fingerprint through the fingerprint pick-up device (which is a biological feature pick-up device 26). When the fingerprint is identified is being correct, the smart mobile device and its touch screen 28 can be awakened.

On the other hand, when the electronic key 24 is connected to the lock 22, inputting of the biological feature is not used to awaken the smart mobile device. Specifically, in step S137, inputting of the biological feature is detected. When the biological feature is not inputted while the electronic key 24 is connected to the lock 22, a terminating procedure is executed to disconnect the electronic key 24 from the lock 22 (S139). Namely, when the electronic key 24 and the lock 22 are near and connected to each other. The biological feature (of the holder of the smart mobile device) picked up by the biological feature pick-up device 26 is considered as a real-time biological feature and is identified in step S151. When the real-time biological feature does not match with the authenticated biological feature, the unlocking information is not outputted (step S153).

On the other hand, when the real-time biological feature matches with the authenticated biological feature, the unlocking information is outputted from the electronic key 24 to the lock 22 (step S155). The unlocking information includes a lock identification information.

In step S157, the unlocking information received by the lock 22 is identified. When the unlocking information is identified as being incorrect, the lock 22 remains in the locking state (step S159). On the other hand, when the unlocking information is identified as being correct, the lock 22 switches to an unlocking state (step S171). In an example that the unlocking information is the hardware identification number, the lock 22 compares the hardware identification number received from the electronic key 24 with the hardware identification number of the lock 22. When the hardware identification number received from the electronic key 24 matches with the hardware identification number of the lock 22, the lock 22 switches to the unlocking state. On the other hand, when the hardware identification number received from the electronic key 24 does not match with the hardware identification number of the lock 22, the lock 22 remains in the locking state. In a case that the lock 22 receives a packet containing the unlocking information, the packet will be decoded before obtaining the unlocking information.

Through identification of whether the smart mobile device (the electronic key 24) is connected to the lock 22, the method according to the present invention can precisely identify the purpose of inputting the biological feature of the holder is to awaken the smart mobile device or to relieve the locking state of the lock 22. Thus, the smart mobile device can serve as the electronic key 24 to perform unlocking of the lock 22 without adversely affecting original operation of the smart mobile device.

Through the background program execution of the lock control app, the method according to the present invention can rapidly connect the electronic key 24 (the smart mobile device) with the lock 22. Furthermore, by inputting the real-time biological feature through the biological feature pick-up device 26, the lock 22 can be unlocked without additional manual operation of the lock control app. Thus, convenient use is provided, and the unlocking speed is fast.

The method according to the present invention obtains the unique identification information of the lock 22 while proceeding with matching of the lock 22. Furthermore, during unlocking, the lock 22 identifies whether the lock identification information is correct to thereby identify whether the electronic key 24 sending the lock identification information is a matched electronic key 24. Thus, the lock 22 cannot be unlocked by an unmatched electronic key 24, providing excellent safety in use.

The method according to the present invention uses near-field communication (NFC), such that the unlocking information is less likely to be intercepted by any person at a remote location.

In the method according to the present invention, the unlocking information will be transmitted to the lock 22 only when the real-time biological feature identification is successful. Thus, even if the electronic key 24 (the smart mobile device) is lost, the person picking up the electronic key 24 cannot easily decode the electronic key 24.

In the method according to the present invention, the real-time biological feature must be inputted before the unlocking information is transmitted, permitting creation of a plurality of authenticated biological features. Furthermore, during unlocking of the lock 22, it is not necessary to awaken the smart mobile device (the electronic key 24), allowing the electronic key 24 to be used by many persons.

Now that the basic teachings of the present invention have been explained, many extensions and variations will be obvious to one having ordinary skill in the art. For example, the biological feature pick-up device 26 can be a device other than a fingerprint pick-up device, such as an audio pick-up device, a finger vein pick-up device, or an image pick-up device.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. An unlocking method comprising the steps of:
   using an electronic key to execute a lock control app for a first time, wherein the lock control app is configured to control a lock, and wherein an account number and a password are set and stored under guidance of the lock control app;
   entering an account and a password to log in under guidance of the lock control app, wherein login of the lock control app is forbidden when the entered account is not identical to the stored account number or the entered password is not identical to the stored password, and wherein login of the lock control app is permitted when the entered account is identical to the stored account number and the entered password is identical to the stored password;

inputting a predetermined biological feature after login of the lock control app;

creating an authenticated biological feature based on the predetermined biological feature;

matching the electronic key with a lock under guidance of the lock control app, wherein the matching of the electronic key with the lock is repeated when the matching with the electronic key with the lock fails;

executing the lock control app as a background program after matching the electronic key with the lock is successful;

checking whether the electronic key is connected to the lock, wherein when a biological feature is inputted while the electronic key is connected to the lock, identifying whether the inputted biological feature matches with the authenticated biological feature, wherein an unlocking information is outputted to the lock connected to the electronic key when the inputted biological feature matches with the authenticated biological feature, wherein the unlocking information is not outputted when the inputted biological feature does not match with the authenticated biological feature, and wherein when no biological feature is inputted while the electronic key is connected to the lock, the electronic key is disconnected from the lock; and identifying whether the unlocking information is correct, wherein the lock switches to an unlocking state when the unlocking information is identified as being correct, and wherein the lock remains in a locking state when the unlocking information is identified as being incorrect.

2. The unlocking method as claimed in claim 1, wherein the electronic key is in a form of a smart mobile device, wherein the lock control app is installed in the smart mobile device, wherein the unlocking method further comprises identifying whether a biological feature is inputted when the electronic key is not connected to the lock, wherein the smart mobile device takes no action when no biological feature is inputted, wherein when the biological feature is inputted while the electronic key is not connected to the lock, whether a biological feature identification is successful is carried out, wherein the smart mobile device is awakened when the biological feature identification is successful, and wherein the smart mobile device is not awakened when the biological feature identification fails.

3. The unlocking method as claimed in claim 1, wherein matching with the lock includes storing an identification information related to the lock in the electronic key, and wherein the identification of the unlocking information includes comparing a lock identification information contained in the unlocking information with the identification information stored in the lock.

4. The unlocking method as claimed in claim 1, wherein the electronic key is connected to the lock by near-field communication, and wherein checking whether the electronic key is connected to the lock includes placing the electronic key near the lock.

5. An unlocking method comprising the steps of:

executing a lock control app by using a smart mobile device, and storing a selected account number and a selected password in the lock control app, wherein the lock control app is configured to control a lock and is installed in the smart mobile device;

entering an account and a password to log in the lock control app under guidance of the lock control app, wherein login of the lock control app is forbidden when the entered account is not identical to the stored selected account number or the entered password is not identical to the stored selected password, and wherein login of the lock control app is permitted when the entered account is identical to the stored selected account number and the entered password is identical to the stored selected password;

inputting a selected biological feature after login of the lock control app;

creating an authenticated biological feature based on the selected biological feature;

matching the smart mobile device with a lock under guidance of the lock control app, wherein the matching with the smart mobile device with the lock is repeated when the matching with the smart mobile device with the lock fails, and wherein the smart mobile device becomes an electronic key when the matching with the smart mobile device with the lock is successful;

executing the lock control app as a background program after matching the electronic key with the lock is successful;

checking whether the electronic key is connected to the lock, wherein when a biological feature is inputted while the electronic key is connected to the lock, identifying whether the inputted biological feature matches with the authenticated biological feature, wherein an unlocking information is outputted to the lock connected to the electronic key when the inputted biological feature matches with the authenticated biological feature, wherein the unlocking information is not outputted when the inputted biological feature does not match with the authenticated biological feature, and wherein when no biological feature is inputted while the electronic key is connected to the lock, the electronic key is disconnected from the lock; and identifying whether the unlocking information is correct, wherein the lock switches to an unlocking state when the unlocking information is identified as being correct, and wherein the lock remains in a locking state when the unlocking information is identified as being incorrect.

6. The unlocking method as claimed in claim 5, further comprising identifying whether a biological feature is inputted when the electronic key is not connected to the lock, wherein the smart mobile device takes no action when no biological feature is inputted, wherein when the biological feature is inputted while the electronic key is not connected to the lock, whether a biological feature identification is successful is carried out, wherein the smart mobile device is awakened when the biological feature identification is successful, and wherein the smart mobile device is not awakened when the biological feature identification fails.

7. The unlocking method as claimed in claim 5, wherein matching with the lock includes storing an identification information related to the lock in the electronic key, and wherein the identification of the unlocking information includes comparing a lock identification information contained in the unlocking information with the identification information stored in the lock.

8. The unlocking method as claimed in claim 5, wherein the electronic key is connected to the lock by near-field communication, and wherein checking whether the electronic key is connected to the lock includes placing the electronic key near the lock.

\* \* \* \* \*